United States Patent [19]

Booher

[11] Patent Number: 4,889,361

[45] Date of Patent: Dec. 26, 1989

[54] COMPOSITE TRACTOR/TRAILER BEAM SPRING SUSPENSION SYSTEM

[75] Inventor: Benjamin V. Booher, Leucadia, Calif.

[73] Assignee: Suspension Group, Ltd., Encinitas, Calif.

[21] Appl. No.: 248,597

[22] Filed: Sep. 26, 1988

[51] Int. Cl.⁴ .............................................. B60G 11/02
[52] U.S. Cl. .................................... 280/718; 280/680; 280/686; 280/720
[58] Field of Search ................ 280/718, 720, 680, 686

[56] References Cited

U.S. PATENT DOCUMENTS

| 4,621,834 | 11/1986 | Aubry et al. | 280/718 |
| 4,753,456 | 6/1988 | Booner | 280/697 |

FOREIGN PATENT DOCUMENTS

| 16785 | 5/1956 | Fed. Rep. of Germany | 280/718 |
| 1940399 | 2/1971 | Fed. Rep. of Germany | 280/718 |
| 44507 | 3/1982 | Japan | 280/718 |
| 286891 | 3/1928 | United Kingdom | 280/718 |
| 2098142 | 11/1982 | United Kingdom | 280/718 |

Primary Examiner—Kenneth R. Rice
Attorney, Agent, or Firm—Baker, Maxham, Jester & Meador

[57] ABSTRACT

A suspension system for supporting the body of a heavy-duty vehicle on an axle and wheel assembly comprises a first suspension hanger for attachment to a longitudinally extending vehicle frame, a second suspension hanger for attachment to the vehicle frame at a position spaced longitudinally from the first hanger, an elongated composite beam spring member secured to the first or second hanger and extending toward the other of the hangers, and an axle attachment bracket operatively connected to the composite beam spring between the first and second hangers for supporting an axle.

15 Claims, 3 Drawing Sheets

COMPOSITE TRACTOR/TRAILER BEAM SPRING SUSPENSION SYSTEM

BACKGROUND OF THE INVENTION

The present invention relates to suspension systems, and pertains particularly to improved suspension systems embodying composite beam spring members for heavy-duty tractor/trailer vehicles.

In a number of my prior patents, I disclose vehicle suspension systems employing composite spring elements, which in most of the systems comprise or function as both the spring element and the control arm element. These systems provide improved performance and simpler lighter weight systems than the known prior art.

While composite materials have been utilized for several years for certain structures because of weight savings, they have only recently begun to be explored for use in suspension systems.

As a result of my efforts to reduce the weight and cost of suspension systems while enhancing their performance, I have developed suspension systems that employ composite materials, particularly for the spring and control arm elements of the suspension systems. The term "composite materials" as used herein means structures constructed in accordance with the disclosure in my U.S. Pat. No. 4,753,456 comprising combinations of fiber and resins.

Most manufacturers and engineers have shied away from the use of composite materials in suspension systems, because of the fear of lack of stability and durability of such systems. Such systems, however, when constructed in accordance with my preferred structures and techniques, have been found to have superior stability and durability. For example, I prefer composite spring systems formed by the pultrusion process as fully disclosed in my U.S. Pat. No. 4,753,456.

As a result of my extensive work and investigation in efforts to develop superior suspension systems, I have discovered a number of qualities and features of composite systems that make them ideally suited for certain geometric arrangements in suspension systems. Springs and suspension systems constructed of composite materials have been found to have a natural damping quality, which normal steel spring materials do not have. This enhances certain road handling qualities of certain types of vehicles. For example, it improves the contact patch adhesion dynamics characteristic of a particular suspension system. This results in improved performance and ride quality.

It is also been discovered that composite materials can be constructed to have the capability of three to four million cycles, as opposed to about fifty thousand cycles for steel springs. This refers to full deflection cycles of the spring member. The use of composites therefore can considerably increase the spring life of a given suspension system. Recent developments have resulted in the ability to adapt composite materials to heavy-duty vehicles suspension systems. While my prior patents are directed primarily to lighter weight vehicles, such as passenger vehicles, I have discovered structures and techniques for applying such systems to heavy-duty over the road types of vehicles. This results in considerable cost and, weight savings and increased suspension life for such vehicles. It is, therefore, desirable that the composite suspension systems be available for heavy-duty vehicles.

SUMMARY AND OBJECTS OF THE INVENTION

It is accordingly the primary objects of the present invention to provide improved suspension systems for heavy-duty vehicles.

In accordance with the primary aspect of the present invention, a vehicle axle is suspended between a pair of hangers, one of which connects a composite beam spring between the vehicle frame and the axle, and the other of which is spaced from and on the opposite side of the first hanger, and connects the axle by way of a control arm to the vehicle frame.

BRIEF DESCRIPTION OF THE DRAWING

The above and other objects and advantages of the present invention will become apparent from the following description when read in conjunction with the drawings wherein.

DETAILED DESCRIPTION OF A PREFERRED EMBODIMENT

Figure 1:
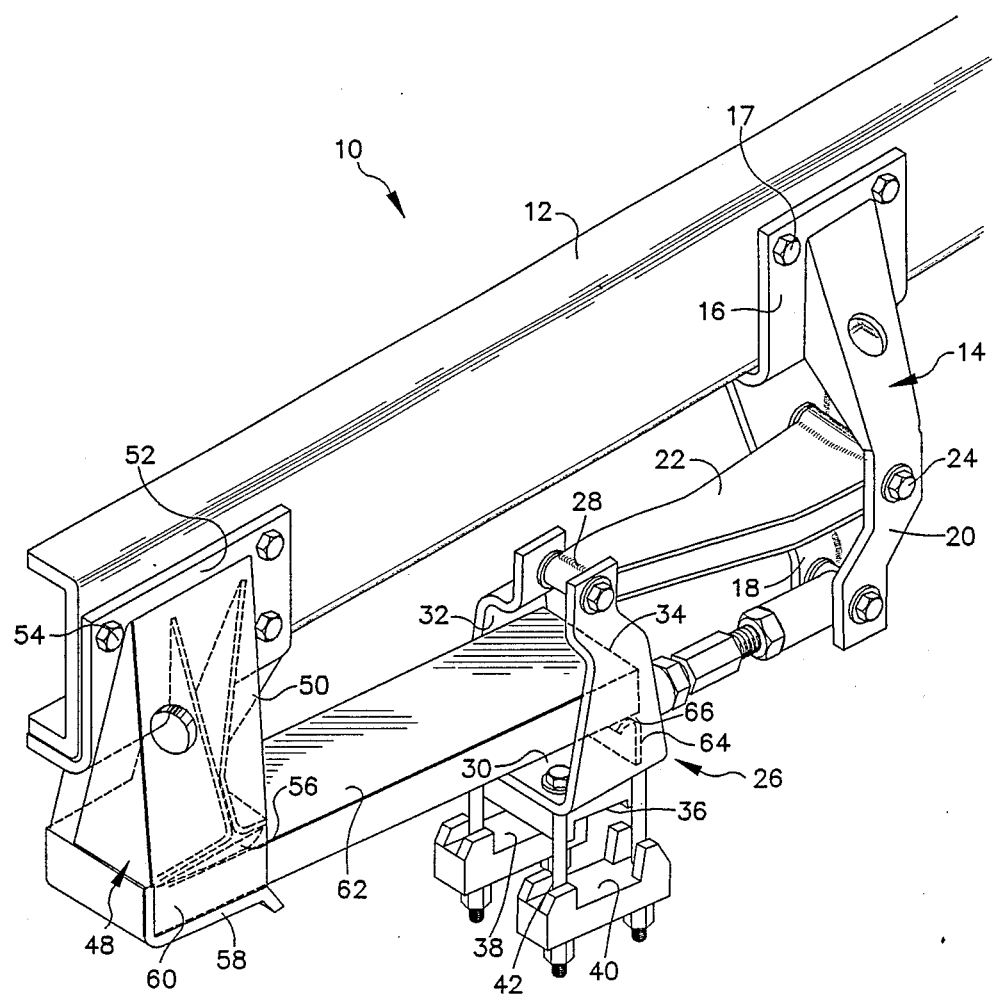
FIG. 1 is a perspective view of a preferred embodiment of the invention.

Referring to FIG. 1 of the drawing, there is illustrated an exemplary embodiment of a suspension system in accordance with the invention, designated generally by the numeral 10. The system is designed primarily for the suspension of heavy-duty vehicles, such as trucks and tractor/trailer combinations. The term heavy-duty vehicles as used herein means a vehicle having a load capacity of two (2) tons or more.

The illustrated system of the present invention is designed to attach to a vehicle frame rail or member 12, such as a typical longitudinally extending frame rail of a tractor or trailer chassis. As illustrated in FIG. 1, the system comprises a first suspension hanger bracket 14, which is secured by a base plate 16 directly to the side of the vehicle frame member 12, such as by a plurality of bolts or the like 17. The overall bracket 14 includes a pair of spaced apart downwardly extending generally parallel arm members 18 and 20. An elongated tapered control arm 22 is pivotally connected at one end by a pin or bolt assembly 24 to the bracket 14 between the arms 18 and 20 thereof, and is pivotally connected at the opposite end to an axle bracket or upright 26. The axle bracket 26 has a generally clevis configuration, with a pair of upwardly extending arms that extend parallel upward and inward to a pivot hole connection at 28 to the control arm 22. The axle bracket 26 has a bottom plate 30 and a pair of parallel arms 32 and 34 extending upward.

An axle clamp is secured to the lower part of the axle bracket and includes an upper clamping jaw assembly 36, with opposing pairs of clamping jaws 38 and 40 secured from the axle bracket by means of a plurality of bolts 42.

A spring hanger bracket 48 is secured to the rail 12 aft of the axle, and includes a main body portion 50, with a base plate 52 secured by bolts 54 directly to the frame rail 12. The spring hanger is formed with a box-like socket formed by a cam plate 56, and a spaced cap 58 enclosed by side walls 60. An elongated composite beam spring member 62 having a generally rectangular configuration is mounted with the one end received in the box-like mount, and the opposite end extending into and between the parallel arms 32 and 34 of the axle bracket. The composite spring member 62 extends into and engages a spring pivot member 64 having an upward semi-cylindrical curved surface 66, which engages the lower surface of the beam spring 62. The cam plate 56 results in an increase in the spring rate, with increasing deflection of the beam spring. The beam spring member 62 is cantilevered outward from the mount 48, and the lever arm thereof decreases as the beam spring member is deflected upward into engagement with more of the cam surface.

The beam spring is preferably constructed by a pultrusion process, such as disclosed and claimed in my prior U.S. Pat. No. 4,753,456, which is incorporated herein by reference as though fully set forth.

A torque rod 68 is pivotally connected at one end to the lower end of bracket 14 and at the other end (not shown) to the axle bracket 26. The torque rod 68 is adjustable in length and aids the control arm 22 in counteracting torque transmitted through the suspension linkage from the axle.

Figure 2:
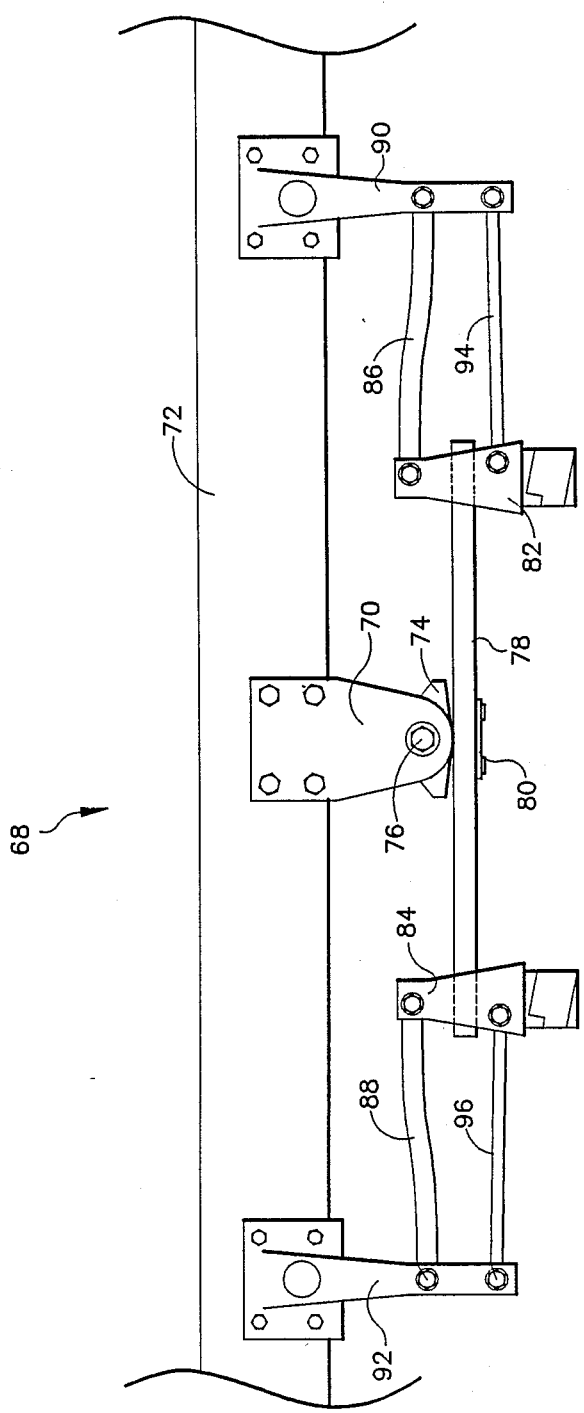
FIG. 2 is side elevation view of an alternate embodiment.

Referring to FIG. 2, a tandem axle embodiment is illustrated wherein a central spring hanger 70 is secured to a frame rail 72, and comprises spaced apart downwardly extending arms between which is pivotally mounted a cam plate 74, which is pivoted by a pin or the like 76 to the bracket 70. A composite beam spring member 78 is secured at its center to the spring plate by suitable clamp or the like 80, and extends in opposite directions therefrom to first and second axle brackets or uprights 82 and 84. The brackets 82 and 84 are supported by control arms 86 and 88 to suspension hangers 90 and 92. Torque rods 94 and 96 are pivotally connected at opposite ends thereof, respectively, to the axle brackets 82 and 84 and the suspension hangers 90 and 92. This provides a single beam spring element supporting a pair of tandem axles.

Figure 3:
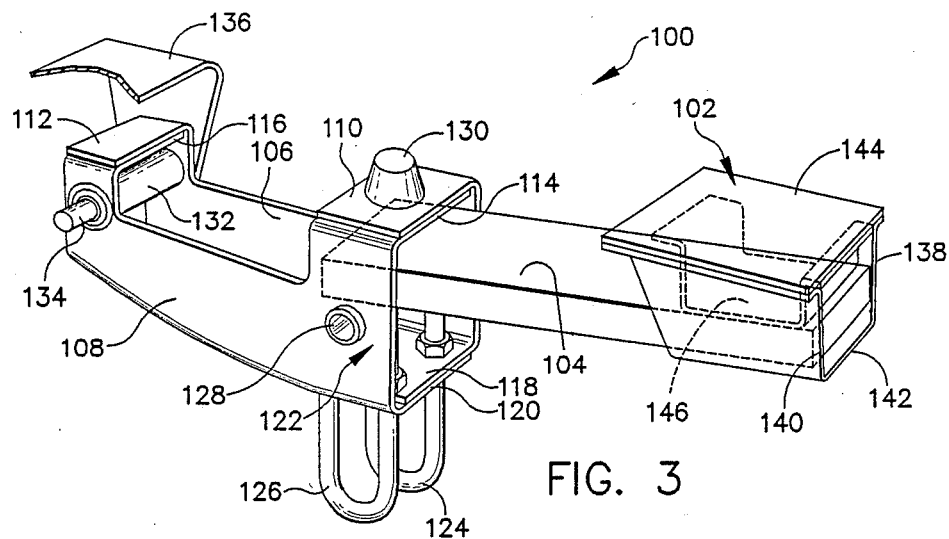
FIG. 3 is a perspective view of another embodiment of the invention.

Referring to FIG. 3, a still further embodiment is illustrated for a single axle and for smaller or lower range of heavy-duty vehicles than the previous embodiment. As illustrated, this system, designated generally by the numeral 100, comprises a spring hanger 102 in which is mounted a composite beam spring element or member 104, which extends into and operatively connects to a combination control arm and axle bracket. The control arm axle bracket comprises a pair of mirror image side plates 106 and 108, each with upper and lower flanges overlapping and secured as by welding, forming a box-like section 122 at the forward end defining an axle bracket to which an axle may be secured by a pair of U-bolts 124 and 126. A cylindrical spring and shock post 128 extends transverse of the box section and is engaged for operative connection to the composite beam spring member 104. A bump stop 130 is mounted on the top of the control arm above the axle bracket for engagement with the bottom of the frame rail (not shown) to limit upward travel of the axle assembly.

The control arm is formed at its opposite end with a bushing or bearing mount 132, which is mounted on a shaft or pin 134 mounted to a suspension hanger 136, which secures such as by welding beneath the frame rail (not shown). This forms a simpler somewhat unitary construction as compared to the previous embodiment.

The spring hanger 102 forms a somewhat box-like configuration, with a socket for receiving and maintaining one end of the beam spring member 104. In the illustrated embodiment, the hanger comprises opposed side walls 138 and 140 connected by a bottom wall 142, and a top wall 144 forming a box-like housing. A cam member 146 forms a curved surface engaging the top of the end of spring 104.

Figure 4:
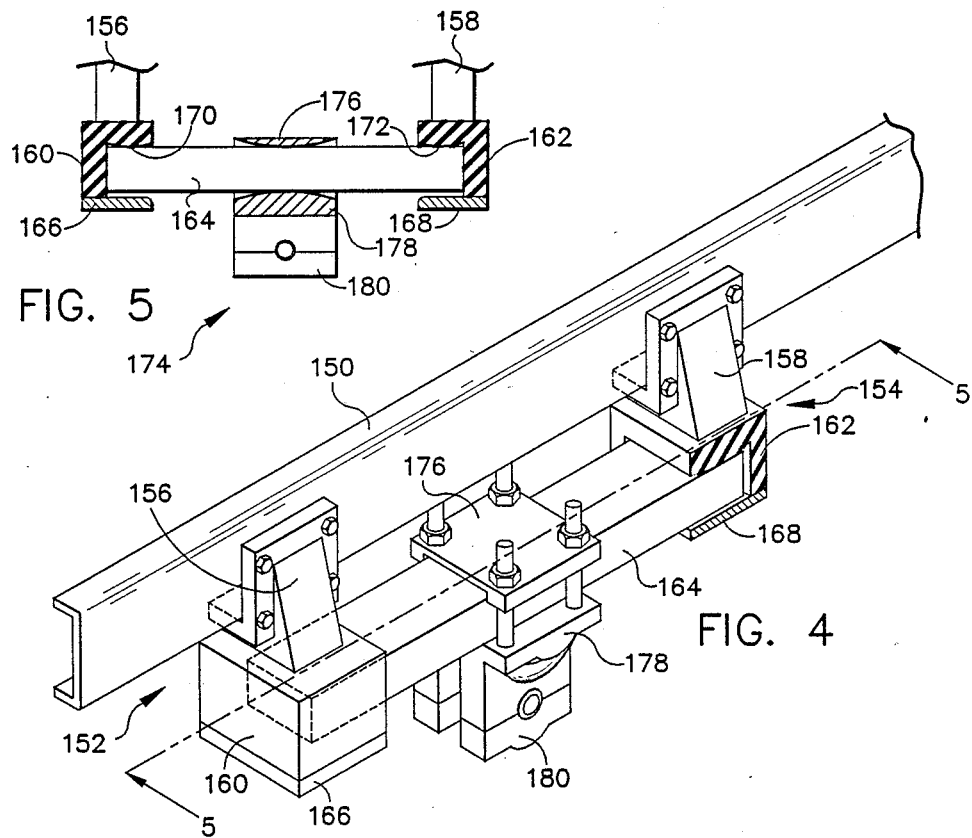
FIG. 4 is a perspective view of still another embodiment of the invention.

This embodiment may also be modified, as in FIG. 2, to provide a tandem axle version (not shown). The tandem axle version would be a mirror image from or about the right hand end of FIG. 3. In this embodiment, a centrally positioned spring hanger is secured to the vehicle frame rail in a central position, and a composite beam spring is mounted at its mid-point to the spring hanger. A pair of identical control arm assemblies, as in the previous embodiment, are pivotally mounted and extend in opposite directions from the respective ends of the composite beam spring. An axle bracket secures an axle in each of the assemblies Referring to FIG. 4, a further embodiment of a composite spring suspension system for a heavy-duty vehicle is illustrated. As illustrated, a longitudinal frame rail 150 is shown with a pair of hangers 152 and 154, each having a generally rectangular box-like configuration and attached by attachment brackets 156 and 158 to the rail 150. Each of the hangers form a box-like housing 160 and 162, with an open end facing each other for receiving the opposite ends of a composite beam spring member 164. The composite beam spring element 164 is preferably formed by the pultrusion process, and is formed straight with a uniform cross-sectional configuration throughout its length.

Figure 5:
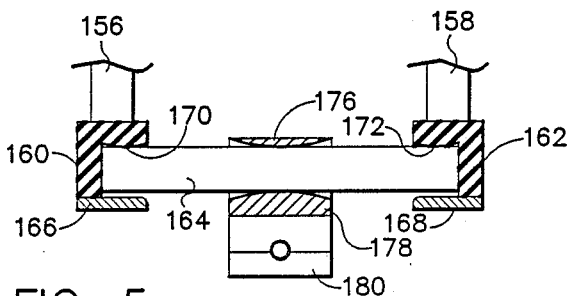
FIG. 5 is a view taken on 5—5 of FIG. 4.

Referring to FIG. 5, each of the hangers form a socket for receipt of the end of the beam spring member 164. Each of the sockets have an upper wall that defines a cam 170 and 172 for progressive engagement with the upper surface of the end of the spring member 164 as it deflects under load. An axle bracket 174 is clamped to the center of the spring member 164, and includes upper cam plate 176 and lower cam plate 178 for progressive engagement with the spring member 164 under load deflection. An axle clamp 180 of suitable form attaches an axle to the spring member assembly.

Composite beam spring suspension systems, in accordance with the invention, have unique characteristics and advantages over typical steel leaf spring systems. Among the advantages are improved performance characteristics, such as better road adhesion due to natural damping properties. Composite beam spring units are simpler to manufacture in that it can function as a single piece component and be manufactured by the pultrusion process. The single component replaces the multiple elements of metallic leaf springs.

The composite suspension systems are typically simpler to manufacture, lighter in weight, and have a longer life than typical metallic beam spring systems. Composite beam spring elements, particularly those constructed by the pultrusion process, have a cycle life many times that of steel and other metallic springs. Composite beam spring systems can also be manufactured faster and easier by using the pultrusion process. This process provides higher production rates, with reduced or lower equipment and labor costs.

While I have illustrated and described my invention by means of specific embodiments, it is to be understood that numerous changes and modifications may be made therein without departing from the spirit and scope of the invention as defined in the appended claims.

I claim:

1. A suspension system for supporting the body of a heavy-duty vehicle on an axle and wheel assembly, comprising:
   a first suspension hanger for attachment to a longitudinally extending vehicle frame;
   a second suspension hanger for attachment to said vehicle frame at a position spaced longitudinally from said first hanger;
   an elongated unitary composite beam spring member secured in canterlevered fashion to one of said first and said second hangers and extending toward the other of said first and second hangers;
   a cam on said one of said hangers for progressive engagement with said beam spring member as it deflects under load; and
   an axle attachment bracket operatively connected to said composite beam spring member between said first and said second hangers for supporting an axle therewith.

2. A suspension system for a heavy-duty vehicle according to claim 1 wherein:
   said beam spring member is supported at its center to one of said hangers and is operatively connected to an axle at each end thereof.

3. A suspension system for a heavy-duty vehicle according to claim 1 wherein:
   said hanger comprises a box-like cavity and said beam spring member extends into and is supported by engagement with walls of said cavity.

4. A suspension system for a heavy-duty vehicle according to claim 1 further comprising:
   a control arm connected at one end to the other of said hangers and at the other to said axle bracket for controlled guiding movement of said axle.

5. A suspension system for a heavy-duty vehicle according to claim 4 further comprising:
   a torque rod connected at one end to said other of said hangers and at the other end to said axle bracket.

6. A suspension system for supporting the body of a heavy-duty vehicle on an axle comprising:
   first suspension hanger for attachment to a longitudinally extending vehicle frame member and having a box-like socket therein for receiving a spring member;
   a second suspension hanger for attachment to said longitudinally extending vehicle frame member spaced longitudinally from said first hanger;
   an axle attachment bracket positioned between said first and said second hangers;
   an elongated unitary composite beam spring member having a generally rectangular cross-sectional configuration extending and secured into said first of said hangers and to said axle attachment bracket; and
   a control arm connected at one end to the other of said hangers and at the other to said axle attachment bracket for controlling movement of said axle.

7. A suspension system for a heavy-duty vehicle according to claim 6 wherein:
   said beam spring is cantilevered from said first of said hangers; and
   a cam on said hanger for progressive engagement with said beam spring member upon deflection thereof.

8. A suspension system for a heavy-duty vehicle according to claim 6 wherein:
   said beam spring member is supported at its center to said first of said hangers and is operatively connected to an axle at each end thereof.

9. A suspension system for supporting the body of a heavy-duty vehicle on an axle comprising:
   first suspension hanger for attachment to a longitudinally extending vehicle frame member;
   a second suspension hanger for attachment to said longitudinally extending vehicle frame member spaced longitudinally from said first hanger;
   an axle attachment bracket positioned between said first and said second hangers;
   an elongated unitary composite beam spring member secured to one of said first and said second hangers and to said axle attachment bracket; and
   a control arm connected at one end to the other of said hangers and at the other to said axle attachment bracket for controlling movement of said axle.

10. A suspension system for a heavy-duty vehicle according to claim 9 wherein:
    said hangers each comprise a box-like cavity;
    said beam spring member extends between and into said cavities and is supported by both of said hangers; and
    a cam surface in at least one of said cavities for progressive engagement with said beam spring member.

11. A suspension system for a heavy-duty vehicle according to claim 9 wherein:
    said beam spring member is formed by the pultrusion process.

12. A suspension system for a heavy-duty vehicle according to claim 9 wherein:
    said spring is a unitary composite elastic beam having a generally uniform rectangular cross-sectional configuration throughout the length thereof.

13. A suspension system for a heavy-duty vehicle according to claim 12 wherein:
    said beam spring is cantilevered from one of said hangers; and
    a cam on said hanger for progressive engagement with said beam spring member upon deflection thereof.

14. A suspension system for a heavy-duty vehicle according to claim 13 further comprising:
    a control arm connected at one end to the other of said hangers and at the other to said axle bracket for controlled guiding movement of said axle; and
    said axle bracket includes a curved surface engaging said beam spring member for progressive engagement therewith upon deflection.

15. A suspension system for a heavy-duty vehicle according to claim 9 further wherein:
    said beam spring member is supported at its center to one of said hangers and is operatively connected to an axle at each end thereof.

* * * * *